United States Patent
Tat et al.

(10) Patent No.: US 11,644,444 B2
(45) Date of Patent: May 9, 2023

(54) ULTRASONIC INSPECTION MARGIN CHECK FOR DESIGN AND MANUFACTURING

(71) Applicant: The Boeing Company, Chicago, IL (US)

(72) Inventors: Hong Hue Tat, Redmond, WA (US); Yuan-Jye Jason Wu, Issaquah, WA (US); Anuj K. Adhikaram, Shoreline, WA (US); Christopher R. Loesche, Bothell, WA (US)

(73) Assignee: The Boeing Company, Arlington, VA (US)

( * ) Notice: Subject to any disclaimer, the term of this patent is extended or adjusted under 35 U.S.C. 154(b) by 94 days.

(21) Appl. No.: 17/505,156

(22) Filed: Oct. 19, 2021

(65) Prior Publication Data

US 2022/0268738 A1 Aug. 25, 2022

Related U.S. Application Data

(60) Provisional application No. 63/152,473, filed on Feb. 23, 2021.

(51) Int. Cl.
   *G01N 29/07* (2006.01)
(52) U.S. Cl.
   CPC ....... *G01N 29/07* (2013.01); *G01N 2291/015* (2013.01); *G01N 2291/0231* (2013.01); *G01N 2291/106* (2013.01)
(58) Field of Classification Search
   CPC ............. G01N 29/07; G01N 2291/262; G01N 2291/0231; G01N 29/262; G01N 29/28; G01N 2291/044; G01N 2291/015; G01N 29/4427; G01N 2291/106
   USPC .......................................................... 73/584
   See application file for complete search history.

(56) References Cited

U.S. PATENT DOCUMENTS

| | | | |
|---|---|---|---|
| 9,575,033 B1 * | 2/2017 | Georgeson | G01N 29/11 |
| 9,816,967 B2 * | 11/2017 | Schroeder | G01N 29/265 |
| 10,571,385 B2 | 2/2020 | Tat et al. | |
| 11,143,625 B2 * | 10/2021 | Kennedy | G01N 29/07 |
| 11,327,052 B2 * | 5/2022 | Gagnon | G01N 29/223 |
| 11,460,445 B2 * | 10/2022 | Takahashi | G01N 29/4472 |

* cited by examiner

*Primary Examiner* — Jacques M Saint Surin
(74) *Attorney, Agent, or Firm* — Ostrager Chong Flaherty & Broitman P.C.

(57) ABSTRACT

A method for quantitatively evaluating the expected ultrasonic inspectability of a designed part using ray tracing. First, a model of a part imported. Materials having different indices of refraction are selected for the part and an acoustic coupling medium. Then the following structures and positional relationships are defined: an ultrasonic transducer array comprising a plurality of elements, a position of the acoustic coupling medium between the transducer array and the part, and a plurality of positions of a transmit aperture relative to the part. For each defined position of the transmit aperture, a path of a respective ray is traced from a center of the transmit aperture through the part and then to a respective receive location on the transducer array. Also, a respective value of an inspectability margin is calculated based at least in part on a respective distance between a center of the receive aperture and the respective receive location. Each value of the inspectability margin is compared to a threshold value.

23 Claims, 14 Drawing Sheets

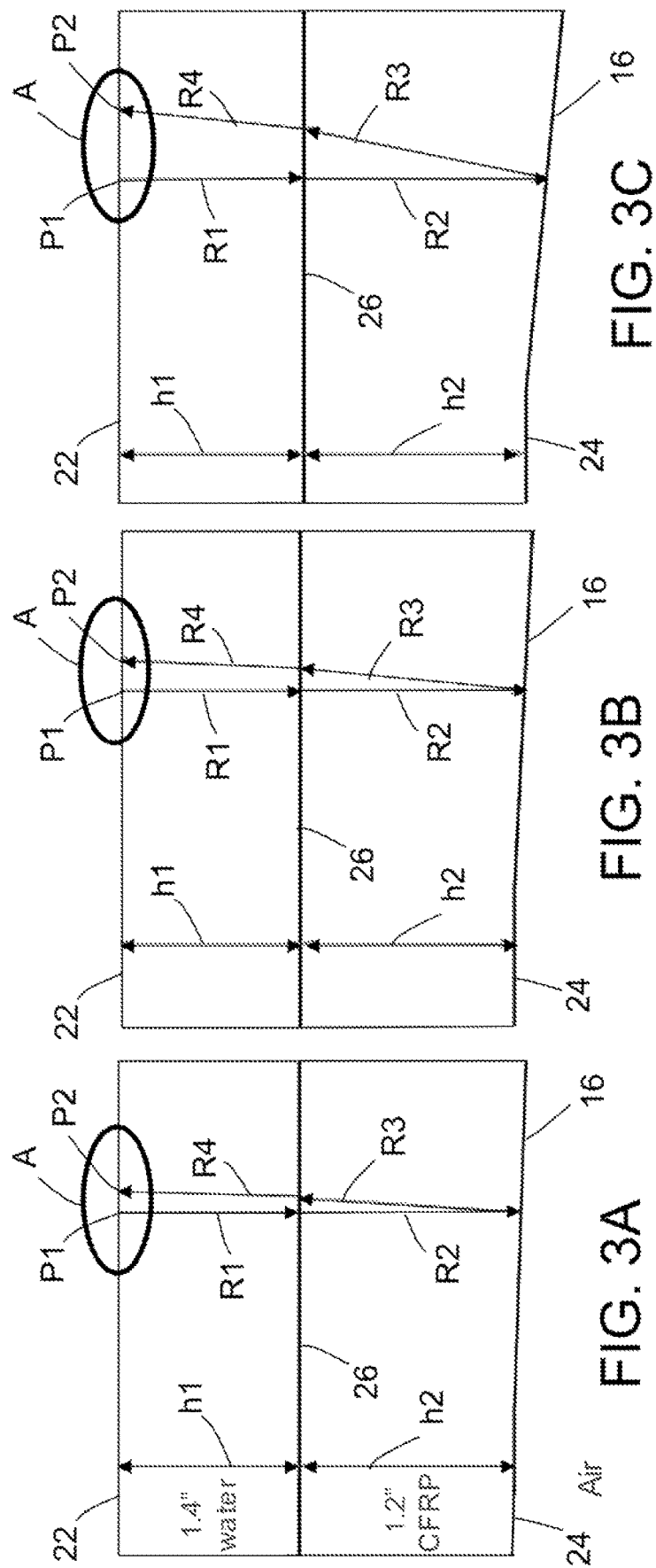

Location along part

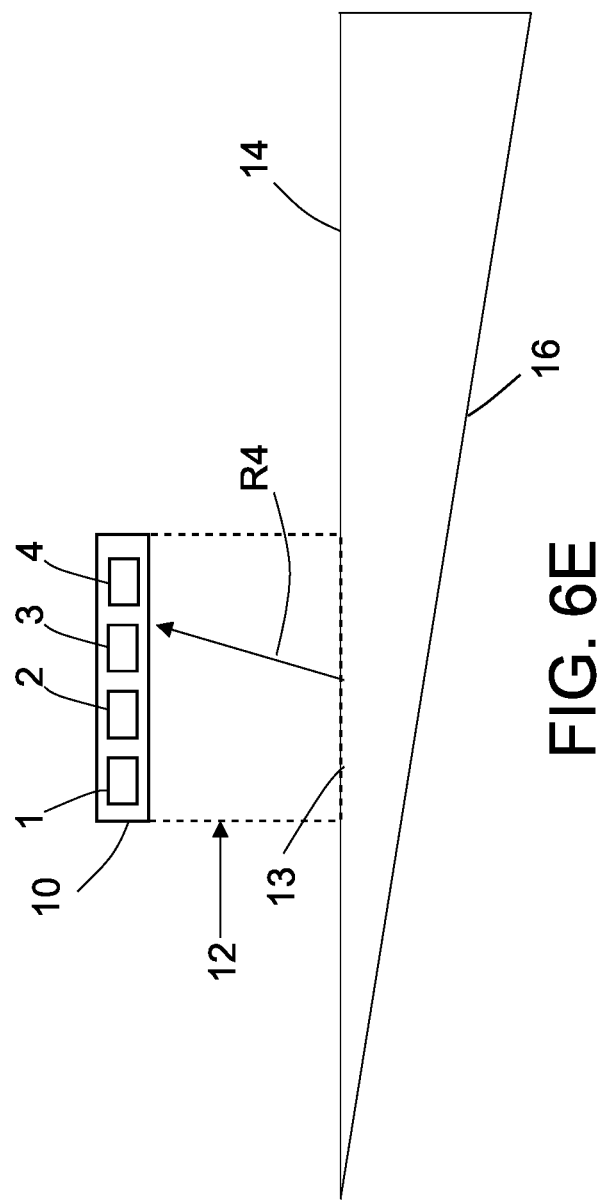

ULTRASONIC INSPECTION MARGIN CHECK FOR DESIGN AND MANUFACTURING

RELATED PATENT APPLICATION

This application claims the benefit, under Title 35, United States Code, Section 119(e), of U.S. Provisional Application No. 63/152,473 filed on Feb. 23, 2021.

BACKGROUND

The present disclosure relates generally to non-destructive inspection of structures made of composite material. As used herein, the term "composite material" means a laminate consisting of a stack of adhesively bonded plies, each ply consisting of parallel fibers embedded in an epoxy resin (hereinafter "epoxy") matrix. The plies in a stack typically have different fiber orientations.

In the design of aircraft structure, there are structural requirements. A part that does not meet the structural requirements is not a valid design. Ultrasound is a non-destructive inspection (NDI) method used in the inspection of structures, including composite structures. In accordance with a typical ultrasonic inspection technique, an ultrasonic transducer transmits ultrasound into the structure to be inspected and then detects return ultrasound containing information concerning the integrity of the interrogated structure. The data acquired during an ultrasonic inspection may be used to determine whether the inspected structure satisfies strength and integrity requirements. For example, one strength check method may rely on a laminate-based material allowable database generated from coupon testing.

Ultrasound is the predominant NDI method for composites. However, certain geometries create challenges for ultrasonic inspection. For example, ultrasound is sensitive to the angle of incidence at any interface. In particular, on many aerospace structures, there are non-parallel surfaces, such as ramps. Non-parallel surfaces create angled interfaces which cause impinging ultrasonic waves to scatter. If the ultrasonic inspection is performed in the pulse echo mode (wherein the same ultrasonic transducer array is used to transmit and receive), the ultrasound will be scattered far enough away so that the return ultrasound cannot be received by the ultrasonic transducer array. In this case, the part design cannot be inspected using pulse echo ultrasonic inspection.

In the example case of ramps, the existing solutions to the problem of non-inspectable ramped structures are the following: (1) to limit the ramp angles, but there are no clear rules for allowable ramp angles; (2) to allow the ramp angles, but not require inspection (this adds weight to the aircraft); or (3) to allow certain ramp angles, but change the inspection procedure just for those ramps (this increases the cost and time incurred by the inspection process).

SUMMARY

A part design that results in a part which cannot be inspected should not be a valid design. The subject matter disclosed herein is directed to a method for quantitatively evaluating the expected ultrasonic inspectability of a part having a particular design with two non-parallel surfaces (hereinafter "interfaces"). During an ultrasonic inspection, the ultrasonic transducer array transmits an interrogating ray of ultrasound that is refracted at a first interface (e.g., an acoustic couplant—part interface) and then reflected at a second interface (e.g., a part—air interface) before returning to the ultrasonic transducer array.

More specifically, a process for calculating the risk of a non-inspectability condition during part design is proposed. An "NDI margin check" is created which is similar to a structural margin check. The process is based on definition and calculation of an ultrasonic inspectability metric that measures the distance separating a receive location on the ultrasonic transducer array from the center of the receive aperture due to scattering effects at the non-parallel reflecting interface. The benefits of this metric are the following: (1) the metric can be easily interpreted by engineers other than inspection experts; and (2) the metric can be incorporated into design and manufacturing tools as another constraint in the design space Although various embodiments of methods for quantitatively evaluating the expected ultrasonic inspectability of a designed part will be described in some detail below, one or more of those embodiments may be characterized by one or more of the following aspects.

One aspect of the subject matter disclosed in detail below is a method for quantitatively evaluating the expected ultrasonic inspectability of a designed part, the method comprising: importing a model of a part; selecting a material of the part having a first index of refraction; selecting a material of an acoustic coupling medium having a second index of refraction different than the first index of refraction; defining an ultrasonic transducer array comprising a plurality of elements; defining a position of the acoustic coupling medium between the ultrasonic transducer array and the part; and defining a plurality of positions of a transmit aperture of the ultrasonic transducer array relative to the part. For each defined position of the transmit aperture, the method further comprises: tracing a path of a respective ray from a center of the transmit aperture of the ultrasonic transducer array, into and out of the part, and then to a respective receive location on the ultrasonic transducer array; calculating a respective value of an inspectability margin based at least in part on a respective distance between a center of the receive aperture and the respective receive location on the ultrasonic transducer array; and comparing each value of the inspectability margin to a threshold value. The method may further comprise rejecting the part for manufacture if the values of the inspectability margin indicate that a portion of the part is not ultrasonically inspectable and accepting the part for manufacture if the values of the inspectability margin indicate that the part is ultrasonically inspectable.

In accordance with one embodiment of the method described in the immediately preceding paragraph, tracing comprises: (a) tracing a first path of the first ray through the acoustic coupling medium; (b) simulating refraction of the first ray at a first interface between the acoustic coupling medium and the part at a point of entry into the part; (c) tracing a second path of the first ray through the part from the point of entry to a second interface opposing the first interface; (d) simulating reflection of the first ray at the second interface; (e) tracing a third path of the first ray through the part from the second interface to a point of exit; (f) simulating refraction of the first ray at the first interface at the point of exit; and (g) tracing a fourth path of the first ray through the acoustic coupling medium, which fourth path terminates at the receive location on the ultrasonic transducer array.

Another aspect of the subject matter disclosed in detail below is a system for quantitatively evaluating the expected ultrasonic inspectability of a designed part, which system comprises a computer configured (e.g., programmed) to perform operations corresponding to the steps of the above-described method.

Other aspects of methods for quantitatively evaluating the expected ultrasonic inspectability of a designed part are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 3A-3C are diagrams showing a path of a ray of ultrasound which is scattered away from a transmitting location by an inner mold line (IML) ramp with increasing ramp angles of: 30:1 ramp=1.9 degrees (FIG. 3A); 20:1 ramp=2.86 degrees (FIG. 3B); and 10:1 ramp=5.71 degrees (FIG. 3C). The upper material is water; the lower material is carbon fiber-reinforced plastic (CFRP).

FIG. 6E a diagram showing a path of a ray of ultrasound propagating through the acoustic coupling medium after the ray depicted in FIG. 6D has been refracted at the interface of the acoustic coupling medium and part.

Reference will hereinafter be made to the drawings in which similar elements in different drawings bear the same reference numerals.

DETAILED DESCRIPTION

For the purpose of illustration, methods for quantitatively evaluating the expected ultrasonic inspectability of a designed part will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The methods for quantitatively evaluating the expected ultrasonic inspectability of a designed part proposed herein are enabled by definition and calculation of an ultrasonic inspectability metric using computer simulation. In accordance with the embodiments disclosed herein, the computer simulation employs ray tracing. The ray tracing method used herein calculates the path of ultrasonic waves through a system with regions of varying propagation velocity, refracting interfaces, and reflecting interfaces. An interface may be linear (e.g., a ramp) or curved. Under these circumstances, wavefronts may bend, change direction, or reflect at an interface. Ray tracing solves the problem by propagating simulated narrow beams called rays through the medium.

For the purpose of illustration, various embodiments of a system for evaluating the inspectability of composite structures will be described in the context of aircraft manufacturing. However, it should be appreciated that the technology disclosed herein is equally applicable to manufacturing composite structure other than fuselages, wings, and stabilizers of an aircraft.

Figure 1B:
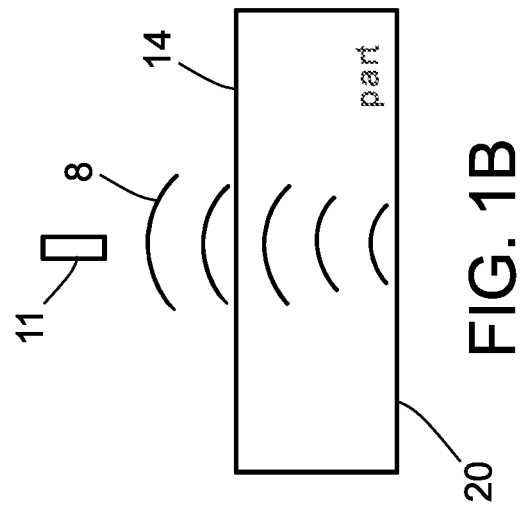
FIG. 1B is a diagram representing an ultrasonic transducer receiving ultrasonic waves which have been reflected from an interface at the back of a part, which interface opposes the interface between the part and an acoustic coupling medium (not shown).
Figure 1A:
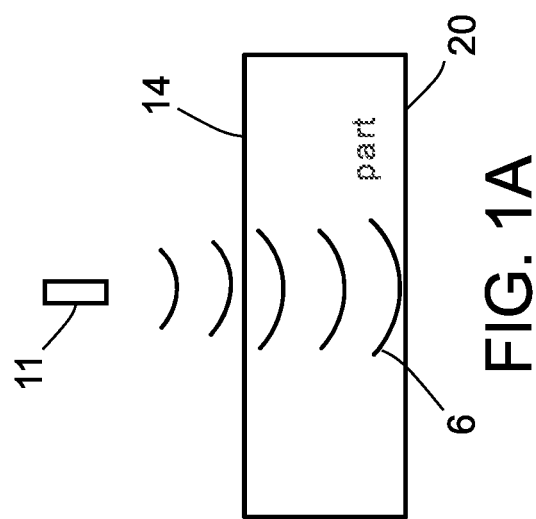
FIG. 1A is a diagram representing an ultrasonic transducer transmitting ultrasonic waves into a part. An acoustic coupling medium between the transducer and the part is not shown.

The baseline inspection for a wing panel made of composite material is pulse echo ultrasound. Ultrasound is transmitted from a transducer, travels through the part, and is received by the same transducer. For example, FIG. 1A is a diagram representing an ultrasonic transducer 11 transmitting ultrasonic waves 6 into a part 14. An acoustic coupling medium between the ultrasonic transducer 11 and the part 14 is not shown. The part 14 has an interface 20 (e.g., a part—air interface) which reflects the ultrasonic waves 6 back toward the ultrasonic transducer 11. FIG. 1B is a diagram representing the ultrasonic transducer 11 receiving ultrasonic waves 8 which have been reflected from the interface 20. The ultrasonic transducer 11 converts impinging ultrasound into electrical signals which carry information indicative of the structural integrity of the part 14.

Figure 2:
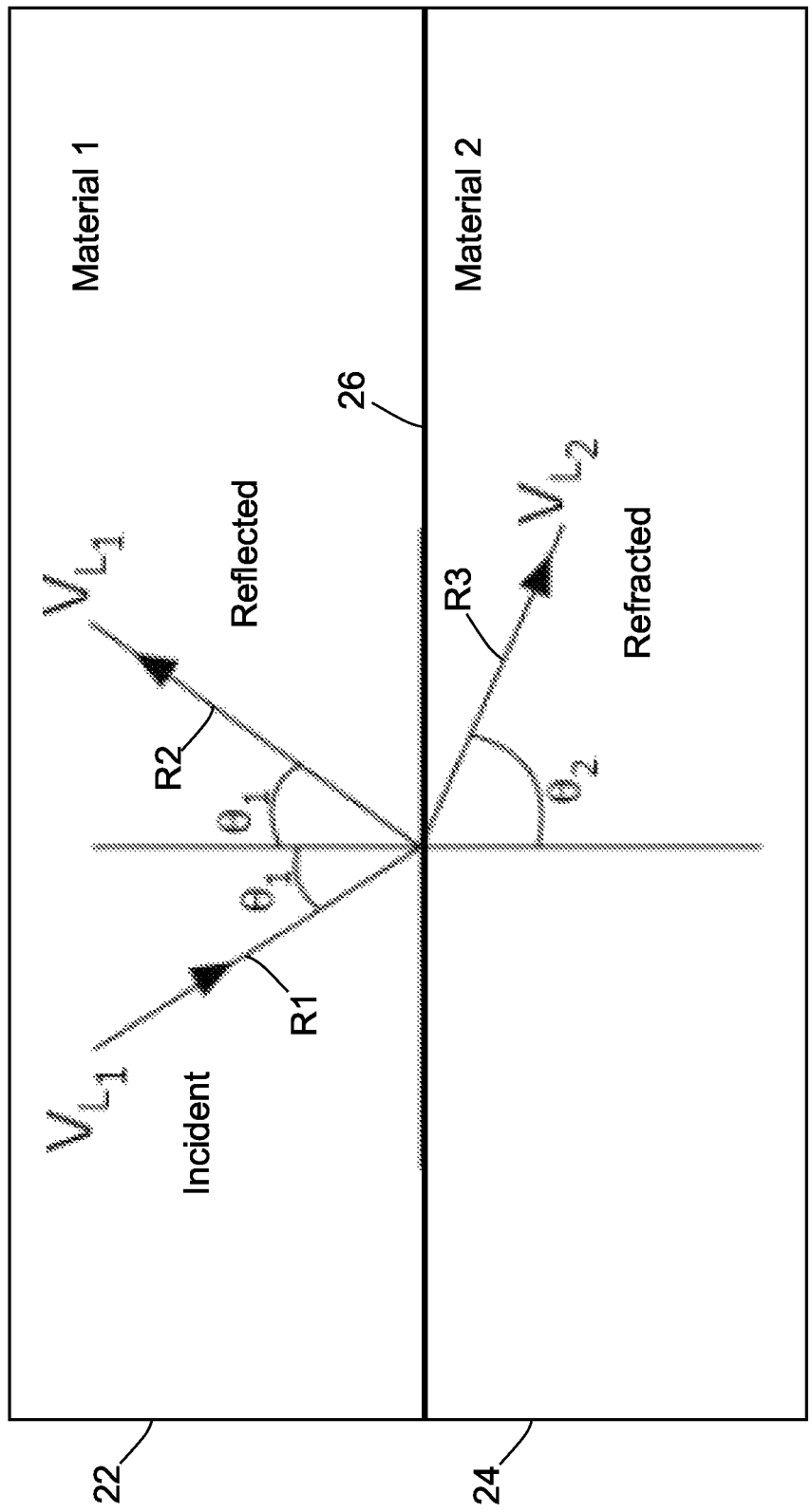
FIG. 2 is a diagram representing a ray of ultrasound impinging on an interface of two materials having differing indices of refraction. The diagram shows a scenario in which one part of the incident ray is reflected (in accordance with the law of reflection) and another part of the incident ray is refracted (in accordance with Snell's law) at the interface.

As previously mentioned, the ray tracing method used herein calculates the path of ultrasonic waves through a system with regions of varying propagation velocity and interfaces which refract and/or reflect. FIG. 2 is a diagram including arrows representing a ray of ultrasound which is partially reflected and partially refracted. The arrow R1 represents the path (hereinafter "path R1") of an incident ray of ultrasound propagating through a first material 22 at a velocity $V_{L1}$. In the example scenario depicted in FIG. 2, the incident ray having the path R1 impinges on an interface 26 where the first material contacts a second material 24. One portion of the incident ray is reflected at the interface 26 and continues to propagate at velocity $V_{L1}$ in the first material 22 along a path represented by arrow R2 (hereinafter "path R2"). Because the first and second materials 22 and 24 have different indices of refraction, another portion of the incident ray is refracted at the interface and then propagates at velocity $V_{L2}$ ($V_{L1} \neq V_{L2}$) in the second material 24 along a path represented by arrow R3 (hereinafter "path R3").

In accordance with the law of reflection, the angle between path R1 of the incident ray and a line N normal to interface 26 and the angle between path R2 of the reflected ray and line N normal to interface 26 are equal ($\theta_1$). In accordance with Snell's law, the angle $\theta_2$ between path R3 of the refracted ray and line N normal to interface 26 may be calculated using the equation:

$$\frac{\sin\theta_1}{\sin\theta_2} = \frac{V_{L1}}{V_{L2}}$$

FIGS. 3A-3C are diagrams showing a path of a ray of ultrasound which is scattered away from a transmitting location by an inner mold line (IML) ramp with increasing ramp angles of: 30:1 ramp=1.9 degrees (FIG. 3A); 20:1 ramp=2.86 degrees (FIG. 3B); and 10:1 ramp=5.71 degrees (FIG. 3C). The upper material 22 is water; the lower material 24 is carbon fiber-reinforced plastic (CFRP). The water contacts the CFRP part at an interface 26. The simulation results presented in FIGS. 3A-3C were derived assuming that height h1 of the water is 1.4", whereas the height h2 of the CFRP is 1.2".

Each of FIGS. 3A-3C depicts a scenario in which a ray of ultrasound propagates along a series of paths R1 through R4. In each instance, the ray of ultrasound is transmitted from and returned to an ultrasonic transducer array not shown in FIGS. 3A-3C. More specifically, the ray propagates: through the water along path R1 from a point of entry P1 to the interface 26; through the CFRP along path R2 from the interface 26 to an IML ramp 16; through the CFRP along path R3 after reflection at the IML ramp 16; and through the water along path R4 from the interface 26 to a point of exit P2.

The ellipse A in each of FIGS. 3A-3C surrounds the point of entry P1 and the point of exit P2. The point of entry P1 is collocated at the center of the transmit aperture of the ultrasonic transducer array, which is in contact with the water; the point of exit P2 is collocated at a receive location on the ultrasonic transducer array. As seen in FIGS. 3A and 3B, the separation distance between points P1 and P2 when the ramp angle is 2.86 degrees (see FIG. 3B) is greater than the separation distance when the ramp angle is 1.90 degrees (see FIG. 3A). Analogously, the separation distance between points P1 and P2 when the ramp angle is 5.71 degrees (see FIG. 3C) is greater than the separation distance when the ramp angle is 2.86 degrees (see FIG. 3B). Thus, the simulation results confirmed that ultrasound scatters farther away from the ultrasound source (the center of the transmit aperture) with increasing ramp angle.

FIGS. 3A-3C show scattering of ultrasound away from the center of the transmit aperture due the presence of an IML ramp 16 in the material 24. Undesirable scattering may also be caused by other structures in a wing panel configuration.

Figure 4B:
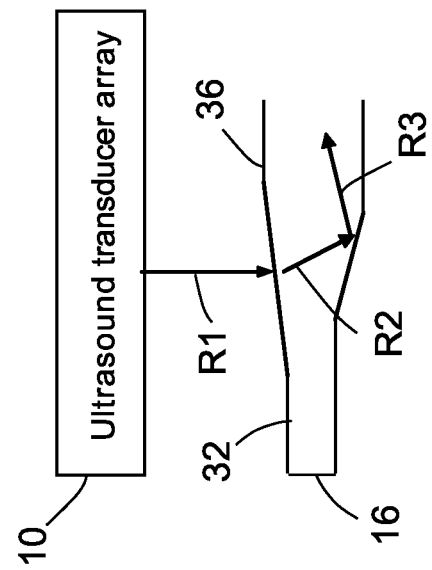
FIGS. 4A and 4B are diagrams showing a path of a ray of ultrasound which is scattered away from a transmitting location by outer mold line (OML) pad-ups (FIG. 4A) or by OML and IML ramps (FIG. 4B) of a wing panel.
Figure 4A:
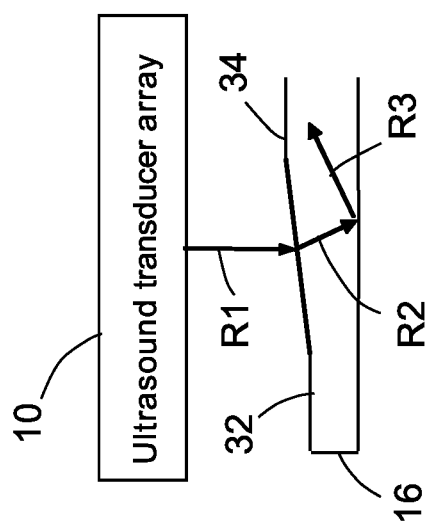

For example, FIG. 4A shows a path of a ray of ultrasound which is scattered away from the center of a transmit aperture of an ultrasound transducer array 10 by an OML pad-up 34 of a part 14 (e.g., of a wing panel) having an OML skin 32. The acoustic couplant between ultrasound transducer array 10 and part 14 is not shown in FIG. 4A. The ray of ultrasound propagates through the acoustic couplant along a path R1. At the interface of the acoustic couplant and OML pad-up 34, the ray is refracted and then propagates through the part 14 and to an interface 20 along a path R2. Following reflection at the interface 20, the ray propagates through the part 14 along a path R3 and does not impinge on the ultrasound transducer array 10.

FIG. 4B shows a path of a ray of ultrasound which is scattered away from the center of a transmit aperture of an ultrasound transducer array 10 by an OML ramp 36 and an IML ramp 16 of a part 14 (e.g., of a wing panel) having an OML skin 32. The acoustic couplant between ultrasound transducer array 10 and part 14 is not shown in FIG. 4B. The ray of ultrasound propagates through the acoustic couplant along a path R1. At the interface of the acoustic couplant and OML ramp 36, the ray is refracted and then propagates through the part 14 and to the IML ramp 16 along a path R2. Following reflection at the IML ramp 16, the ray propagates through the part 14 along a path R3 and does not impinge on the ultrasound transducer array 10.

Figure 5:
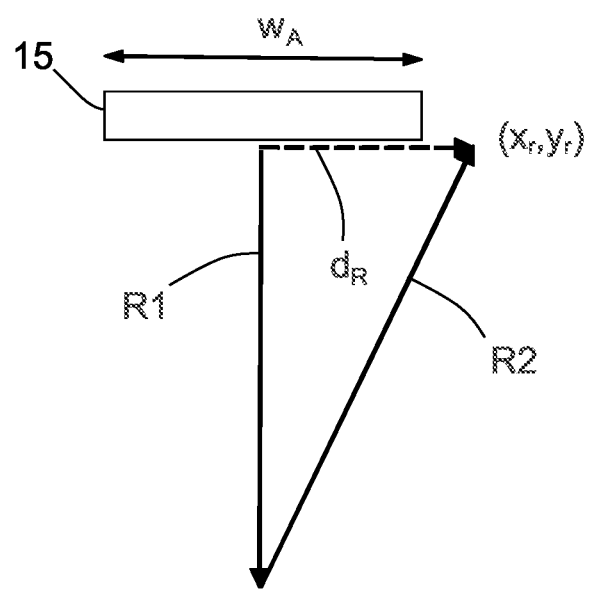
FIG. 5 is a diagram showing a path of a ray of ultrasound transmitted from a transmit aperture of width $w_A$, scattered at a ramp, and received at a location which is separated from a center of the transmit aperture by a distance $d_R$.

As previously mentioned, the methods for evaluating part inspectability proposed herein are enabled by definition and calculation of an ultrasonic inspectability metric. FIG. 5 is a diagram showing the geometry involved in defining an inspectability metric named "NDI margin". The downward arrow in FIG. 5 represents a path R1 of a ray of ultrasound transmitted from an ultrasound transducer array toward a reflective interface (not shown). After reflection, the ultrasound ray propagates along path R2 and impinges at a receive location having coordinates ($x_r$, $y_r$). The dashed line in FIG. 5 indicates a distance $d_R$, which is the separation distance between the center of receive aperture 15 and the receive location ($x_r$, $y_r$). The receive aperture 15 has an aperture width $w_A$. In a linear transducer array, the aperture width $w_A$ equals the product of the number of elements being used multiplied by the size of one element (assuming each element has the same size).

In accordance with one pulse echo ultrasonic inspection technique, assume that the transmit aperture includes the same elements used to form the receive aperture. As seen in FIG. 5, if the separation distance $d_R$ is greater than one-half of the aperture width $w_A$, then the reflected ray will miss the receive aperture 15 and not be detected. Any deviation of the measured separation distance $d_R$ from the allowed distance $w_A/2$ may be measured using an ultrasonic inspectability metric.

In accordance with one proposed implementation, the ultrasonic inspectability metric is expressed by the following equation:

$$NDI \text{ margin} = \frac{w_A/2}{d_R} - 1 \quad (1)$$

This formula has the advantage that the NDI margin is a negative number when the simulated return ray from the inspected part misses (does not impinge upon) the receive aperture 15 of the ultrasound transducer array due to ray scattering effects.

In practice, the receive aperture 15 is usually the same size as the transmit aperture. However, for the NDI margin check proposed herein, the receive aperture 15 may be any size. The NDI margin check may be performed with different receive apertures to identify which receive aperture provides the optimal NDI results. Thus, the actual NDI procedure could be altered based on the results of the NDI margin check calculations.

The NDI margin may be calculated in accordance with Eq. (1) at a multiplicity of equally spaced positions along an X or Y axis of a composite part. In the case where the part is a wing panel having a particular design, the X axis is aligned with the spanwise direction and the Y axis is aligned with the chordwise direction. If the NDI margin is negative at multiple locations in a region, that region may be classified as being un-inspectable, in which case that particular design of the wing panel may be rejected for manufacture.

One example of a method for quantitatively evaluating the expected ultrasonic inspectability of a designed part having a ramp will now be described for the purpose of illustration. The proposed methodology is equally applicable to designed parts having curved interfaces. The ray tracing and NDI margin check calculations may be performed by a computer system that is communicatively coupled to a database server in which CAD (or other geometric) models of designed parts are stored. To quantitatively evaluate the inspectability of a particular part design, the corresponding model is imported into the computer system from the database. For example, the designed part may include one or more ramps or other ultrasound-scattering structures. The system operator then interacts with an input interface of the computer system to select a material (e.g., CFRP) of the part having a first index of refraction. This will determine the speed of ultrasound propagation (hereinafter "ultrasound velocity") through the part. In addition, the system operator selects a material (e.g., water or plastic) of an acoustic coupling medium having a second index of refraction. The second index of refraction is different than the first index of refraction;

Thereafter, the system operator defines an ultrasonic transducer array comprising a plurality of elements (e.g., individual piezoelectric transducers). Such definition includes: (a) the frequency of the transmitted ultrasound (e.g., 3.5 MHz); (b) the number of elements in the array (e.g., 64 elements); and (c) the size and spacing (pitch) of the elements in the array (e.g., a pitch equal to 0.08 inch). The pitch is the distance between the centers of two adjacent elements.

Figure 6A:
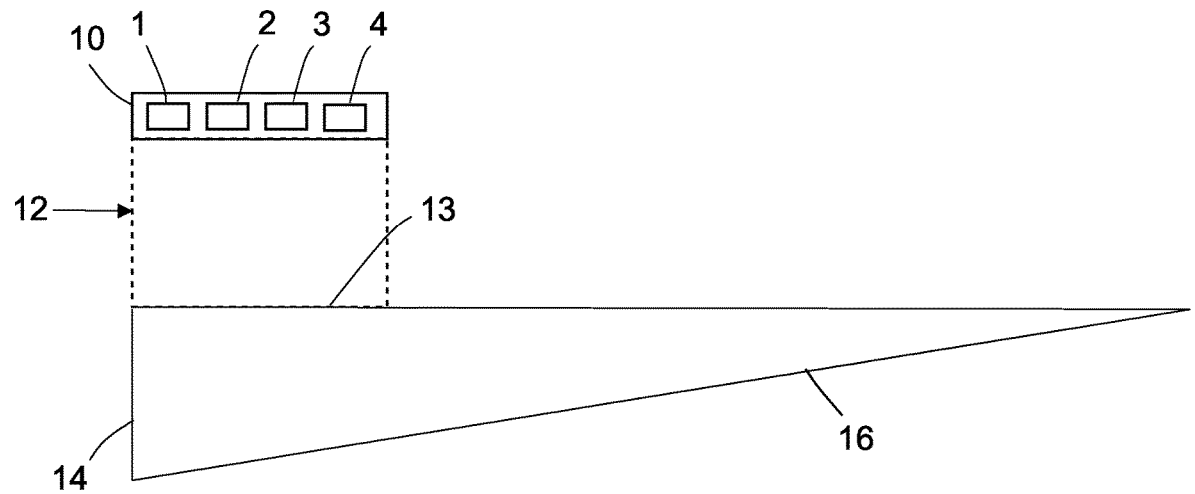
FIG. 6A is a diagram showing positional relationships of an ultrasonic transducer array, an acoustic coupling medium, and a part to be inspected, which positional relationships are defined before tracing the path of a ray of ultrasound transmitted by elements of a transmit aperture.

Next the system operator defines a position of the ultrasonic transducer array relative to the part, with the acoustic coupling medium disposed between the array and the part. FIG. 6A is a diagram showing positional relationships of an ultrasonic transducer array 10, an acoustic coupling medium 12, and a part 14 to be inspected, which positional relationships are defined before tracing the path of a virtual ray of ultrasound transmitted by virtual elements of a transmit aperture during simulation. The example array depicted in FIG. 6A has four elements 1-4 arranged along a line with constant pitch. The part 14 has an IML ramp 16. The acoustic coupling medium 12 is in contact with the OML surface of part 14 at an interface 13.

In accordance with one proposed implementation, a ray tracing algorithm is performed by a computer system using information input by a system operator. For example, the system operator selects the number of elements to be included in the transmit aperture. For a given ray of ultrasound, the center of the transmit aperture is treated as the point of origin of the ray. The ray tracing function is further configured to calculate the point at which a ray intersects an interface, such as the interface between an acoustic coupling medium and a part. At the intersection point, the ray tracing function also calculates the direction in which the ray of ultrasound will travel after crossing the interface using Snell's law.

Initially, the respective positions of ultrasonic transducer array 10, acoustic coupling medium 12, and part 14 are defined as shown in FIG. 6A. Thereafter, a first position of a transmit aperture of the ultrasonic transducer array 10 relative to part 14 is defined. This process includes the step of selecting the number of elements to be included in the transmit aperture. For the purpose of illustration, an example will now be described in which the transmit aperture includes two mutually adjacent elements. It should be appreciated that the position of the transmit aperture relative to the part during scanning may be changed either of two ways: (A) by including different pairs of elements in the transmit aperture for successive ray tracings while not moving the array relative to the part; or (B) by including the same pair of elements in the transmit aperture for successive ray tracings while moving the array relative to the part. In the following example described with reference to FIGS. 6B-6E, 7A, and 7B, the transmit aperture is scanned across the transducer array.

Figure 6B:
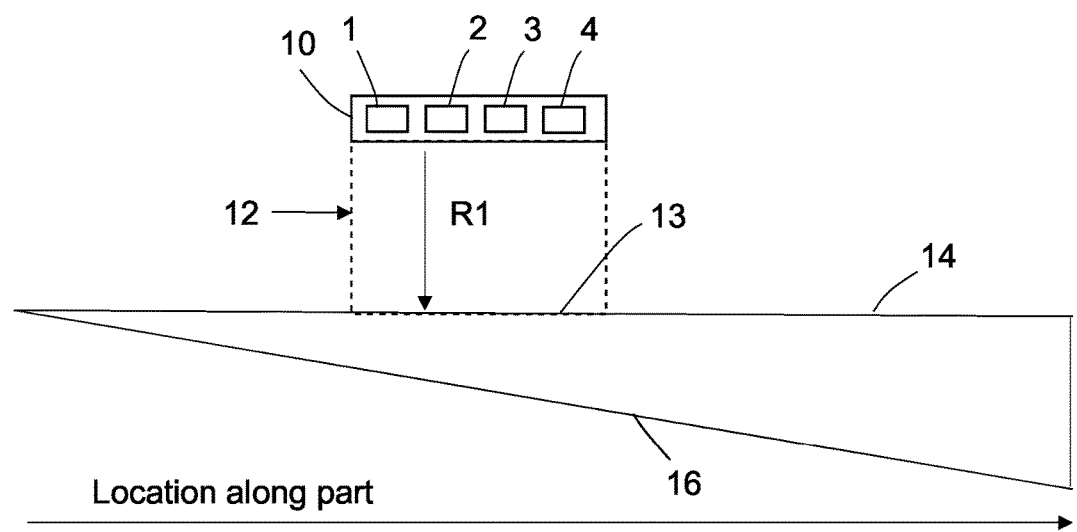
FIG. 6B a diagram showing a path of a ray (e.g., a centerline of a beam) of ultrasound propagating through the acoustic coupling medium depicted in FIG. 6A after being transmitted by a first transmit aperture consisting of first and second elements. (The ramp in FIG. 6A is the mirror image of the ramp in FIGS. 6B-6E.)

FIG. 6B is a diagram showing a path R1 of a first ray (e.g., a centerline of a beam) of ultrasound propagating through acoustic coupling medium 12 after being transmitted by a first transmit aperture consisting of elements 1 and 2. The center of the first transmit aperture is the mid-point between the centers of elements 1 and 2. The path R1 begins at the center of the first transmit aperture and terminates at the interface 13 where acoustic coupling medium 12 is in contact with the OML surface of part 14. The ray tracing function (module) is configured to trace the path R1 of the first ray through the acoustic coupling medium 12 based on the location of the center of the first transmit aperture and the steering angle. The ray tracing function is also configured to simulate refraction of the first ray at interface 13 as the first ray propagates from acoustic coupling medium 12 into part 14 at a point of entry.

Figure 6C:
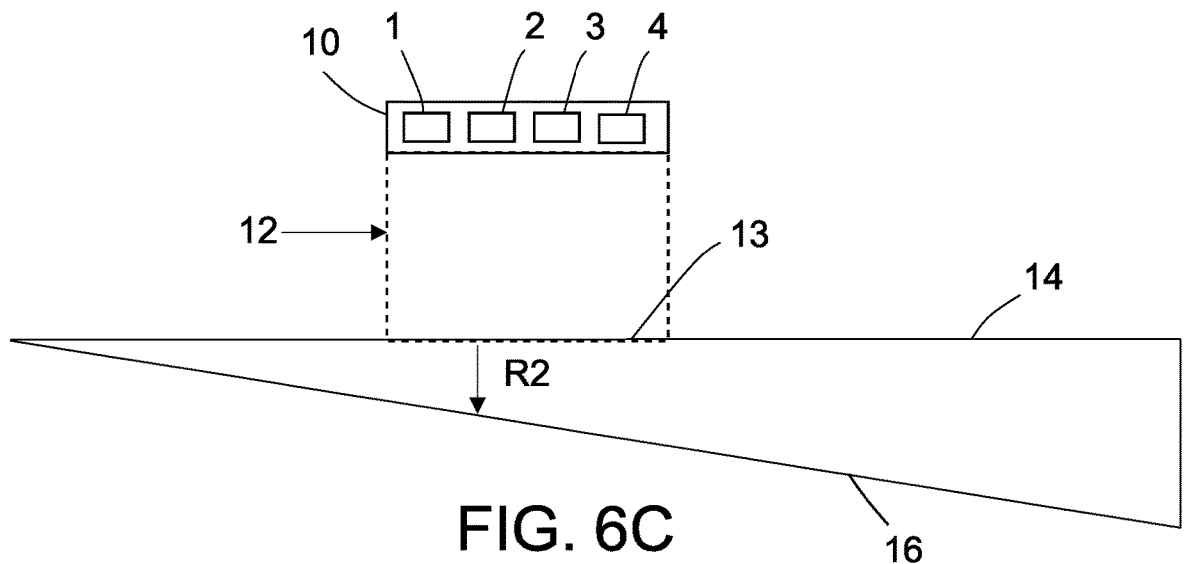
FIG. 6C a diagram showing a path of a ray of ultrasound propagating through the part after the ray depicted in FIG. 6B has been refracted at an interface of the acoustic coupling medium and part.

FIG. 6C is a diagram showing a path R2 of the first ray of ultrasound propagating through part 14 after the first ray has been refracted at interface 13. Path R2 begins at the point of entry into part 14 and terminates at the IML ramp 16. The ray tracing function is further configured to trace the path R2 of the first ray through the part 14 based on a first angle of refraction at interface 13. The ray tracing function is also configured to simulate reflection of the first ray at IML ramp 16.

Figure 6D:
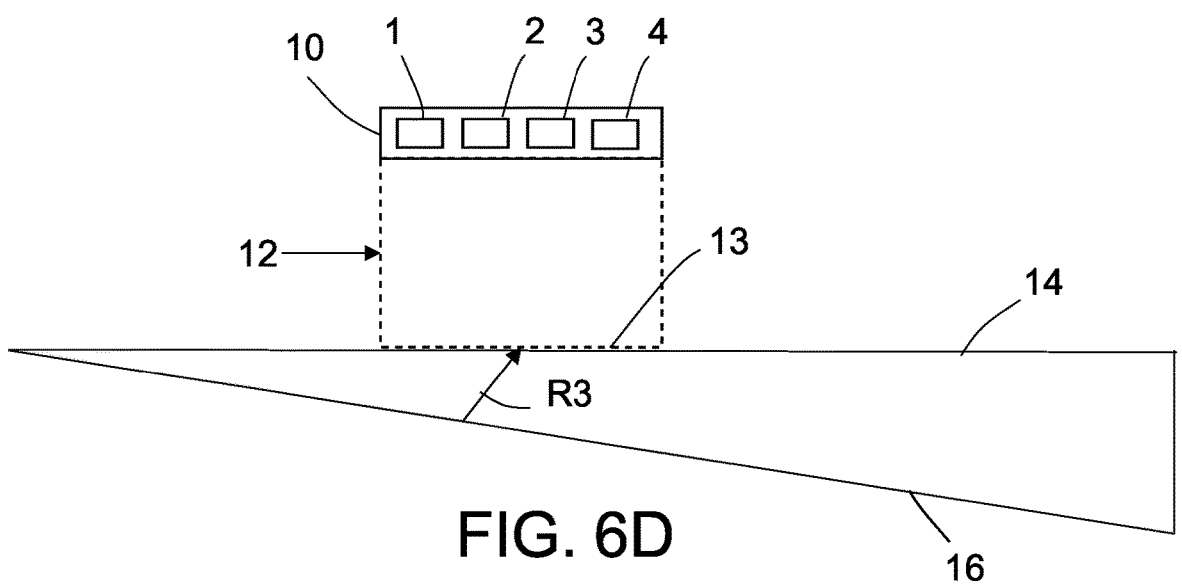
FIG. 6D a diagram showing a path of a ray of ultrasound propagating through the part after the ray depicted in FIG. 6C has been reflected by an IML ramp of the part.

FIG. 6D is a diagram showing a path R3 of the first ray of ultrasound propagating through part 14 after the first ray has been reflected by IML ramp 16. The path R3 begins at the IML ramp 16 and terminates at the interface 13 at a point of exit from part 14. The ray tracing function is configured to trace the path R3 of the first ray through the part 14 based on the angle of reflection at IML ramp 16. The ray tracing function is further configured to simulate refraction of the first ray at interface 13 as the first ray propagates from part 14 into acoustic coupling medium 12 at the point of exit.

FIG. 6E is a diagram showing a path R4 of the first ray of ultrasound propagating through the acoustic coupling medium 12 after the first ray has been refracted at interface 13. The path R4 begins at the point of exit from part 14 and terminates at a receive location on the ultrasound transducer array 10. The ray tracing function is configured to trace the path R4 of the first ray through the acoustic coupling medium 12 based on a second angle of refraction at interface 13. The ray tracing function is further configured to calculate the coordinates $(x_r, y_r)$ of the receive location.

Figure 7A:
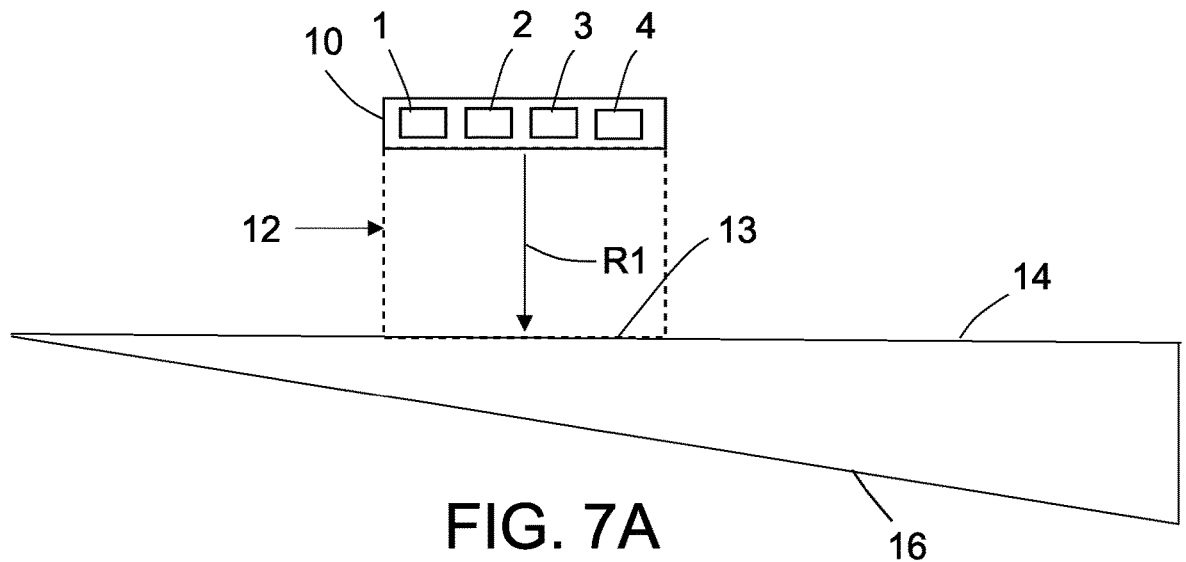
FIG. 7A is a diagram showing a path of a ray of ultrasound propagating through the acoustic coupling medium depicted in FIG. 6A after being transmitted by a second transmit aperture consisting of second and third elements.

The ray tracing process described with reference to FIGS. 6B-6E may be repeated for each subsequent ray to be traced. For example, FIG. 7A is a diagram showing a path R1 of a second ray of ultrasound propagating through the acoustic coupling medium 12 after being transmitted by a second transmit aperture consisting of elements 2 and 3. The center of the second transmit aperture is the mid-point between the centers of elements 2 and 3. The path R1 begins at the center of the second transmit aperture and terminates at the interface 13 where acoustic coupling medium 12 is in contact with the OML surface of part 14. The ray tracing function is configured to trace the path R1 of the second ray through the acoustic coupling medium 12 based on the location of the center of the second transmit aperture and the steering angle. The ray tracing function is also configured to simulate refraction of the second ray of ultrasound at interface 13 as the second ray propagates from acoustic coupling medium 12 into part 14 at a point of entry.

Figure 7B:
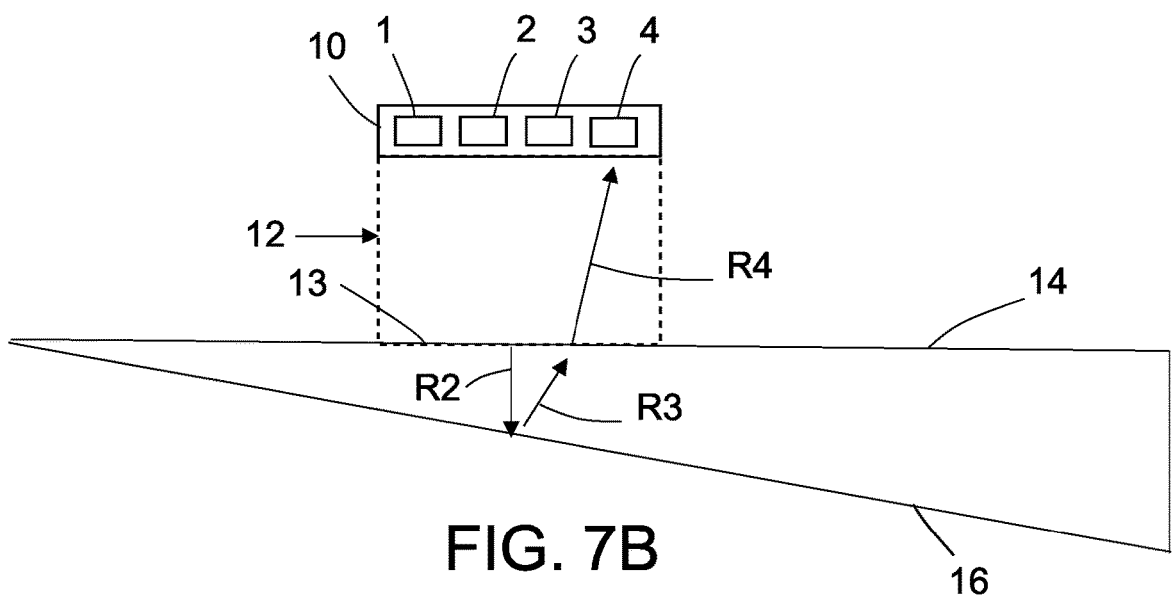
FIG. 7B is a diagram showing the path of the ray depicted in FIG. 7A following refraction at the interface of the acoustic coupling medium and part, reflection at the IML ramp, and refraction at the interface of the acoustic coupling medium and part.

FIG. 7B is a diagram showing the path of the second ray depicted in FIG. 7A following refraction at the interface 13, reflection at IML ramp 16, and refraction at interface 13. FIG. 7B shows paths R2, R3, and R4 as the second ray propagates into and out of the part 14. More specifically, the second ray propagates in succession along: (a) path R2 in part 14 after the second ray has been refracted at interface 13; (b) path R3 in part 14 after the second ray has been reflected by IML ramp 16; and (c) path R4 in acoustic coupling medium 12 after the second ray has been refracted at interface 13.

Path R2 begins at the point of entry into part 14 and terminates at the IML ramp 16. Path R3 begins at the IML ramp 16 and terminates at the interface 13 at the point of exit from part 14. The path R4 begins at the point of exit from part 14 and terminates at a receive location on the ultrasound transducer array 10. The ray tracing function is configured to perform the same steps previously described with reference to FIGS. 6C, 6D, and 6E.

Figure 8A:
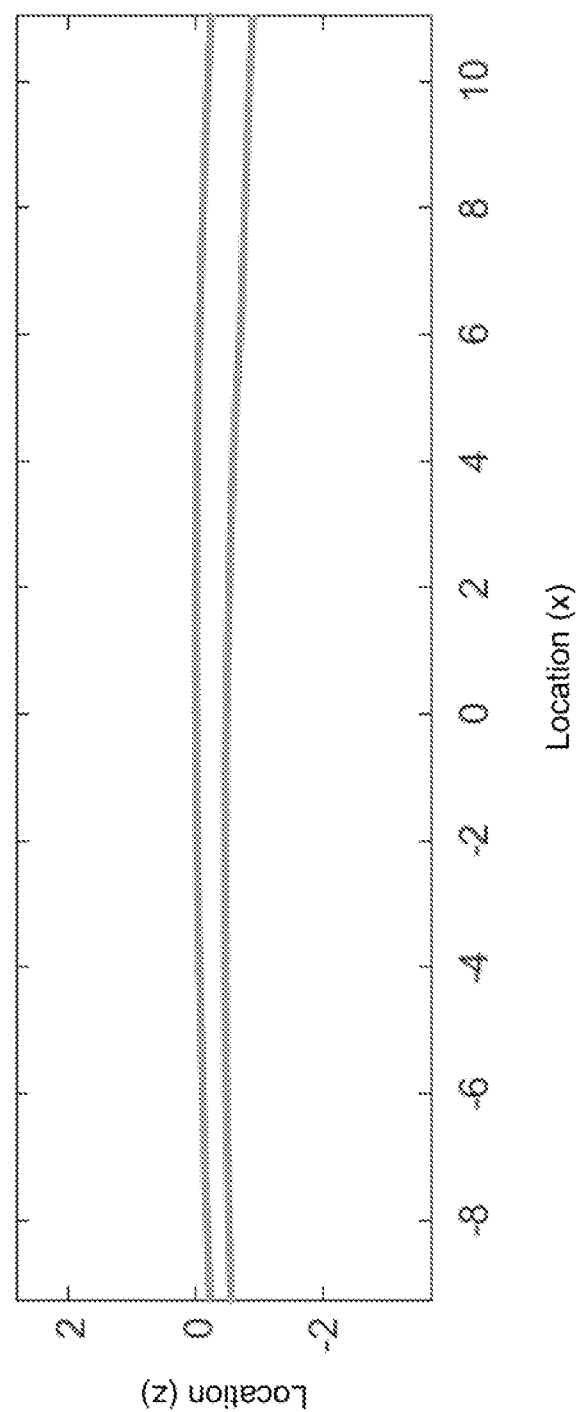
FIG. 8A is a graph the profile of a wing panel having a structure including ramps that scatter ultrasound.

In summary, FIGS. 6B-6E, 7A, and 7B show tracing a ray that propagates from a center of a transmit aperture of an ultrasonic transducer array 10, to the IML ramp 16, and then to a receive location on the ultrasonic transducer array 10. The computer system is further configured to calculate a respective value of an inspectability margin for each ray tracing based at least in part on the estimated distance between a center of the transmit aperture and the receive location. The computer system is further configured (e.g., programmed) to analyze all inspectability metric data generated by the simulations. This analysis includes comparing the values of the inspectability margin to a threshold value and then determining whether the comparison results indicate that the designed part is not inspectable. On the one hand, if a determination is made that the designed part is not inspectable, then the designed part is rejected for manufacture. On the other hand, if a determination is made that the designed part is inspectable, then the designed part is accepted for manufacture For example, FIG. 8A is a graph showing a profile of a wing panel having structure that scatters ultrasound. For example, the X axis may be parallel to the spanwise direction in the frame of reference of the wing panel. The above-described ray tracing method may be applied with respect to as many points along the X axis as are needed to cover the entire wing panel. The inspectability margin values calculated from the ray tracing data are stored in list format in association with respective X locations along the wing panel. (All data is stored in a non-transitory tangible computer-readable storage medium.)

Figure 8B:
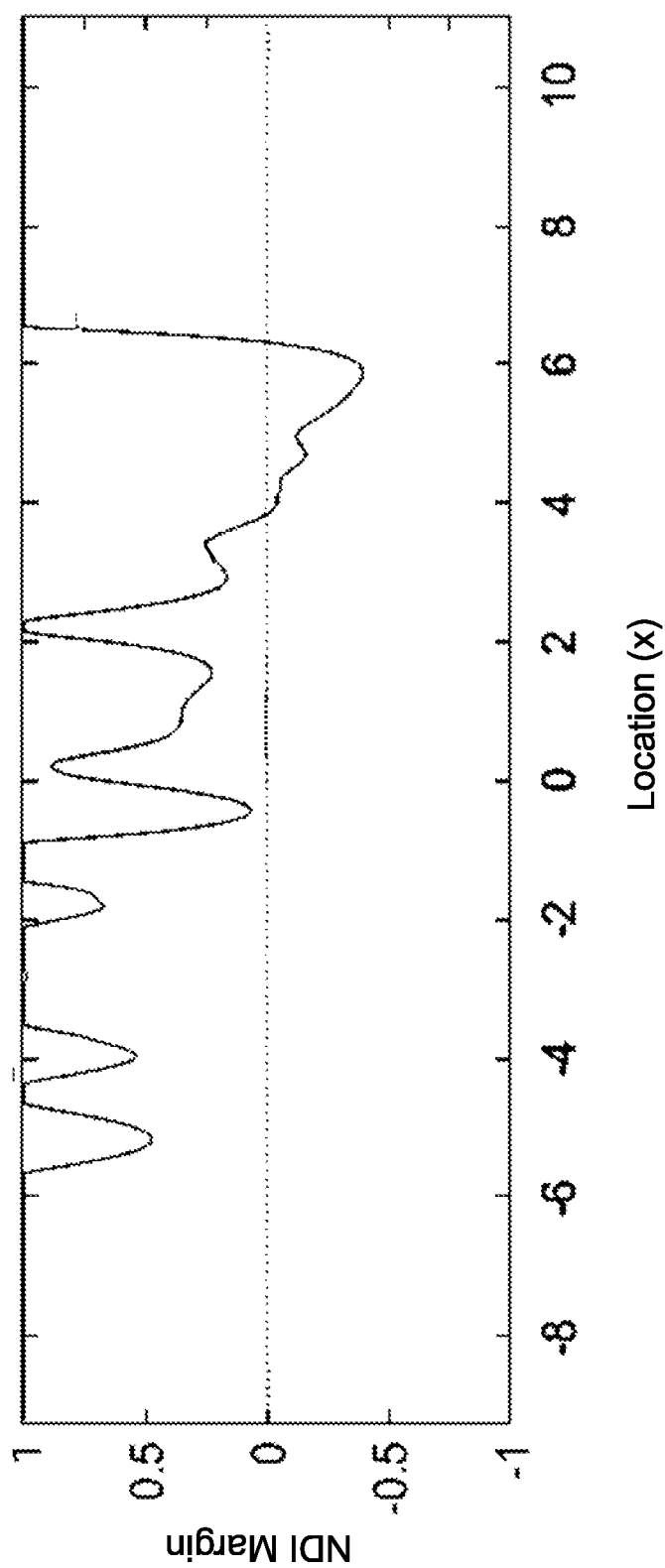
FIG. 8B is a graph showing the NDI margin versus location for the wing panel whose profile is shown in FIG. 8A.

The list of inspectability (NDI) margin values may be plotted to easily identify problem areas along the wing panel. For example, FIG. 8B is a graph showing the NDI margin versus location for the wing panel whose profile is shown in FIG. 8A. The negative NDI margin values in the section that extends from x=4 to x=6 indicate that this section of the wing panel may be difficult to inspect and may need redesign.

Figure 9:
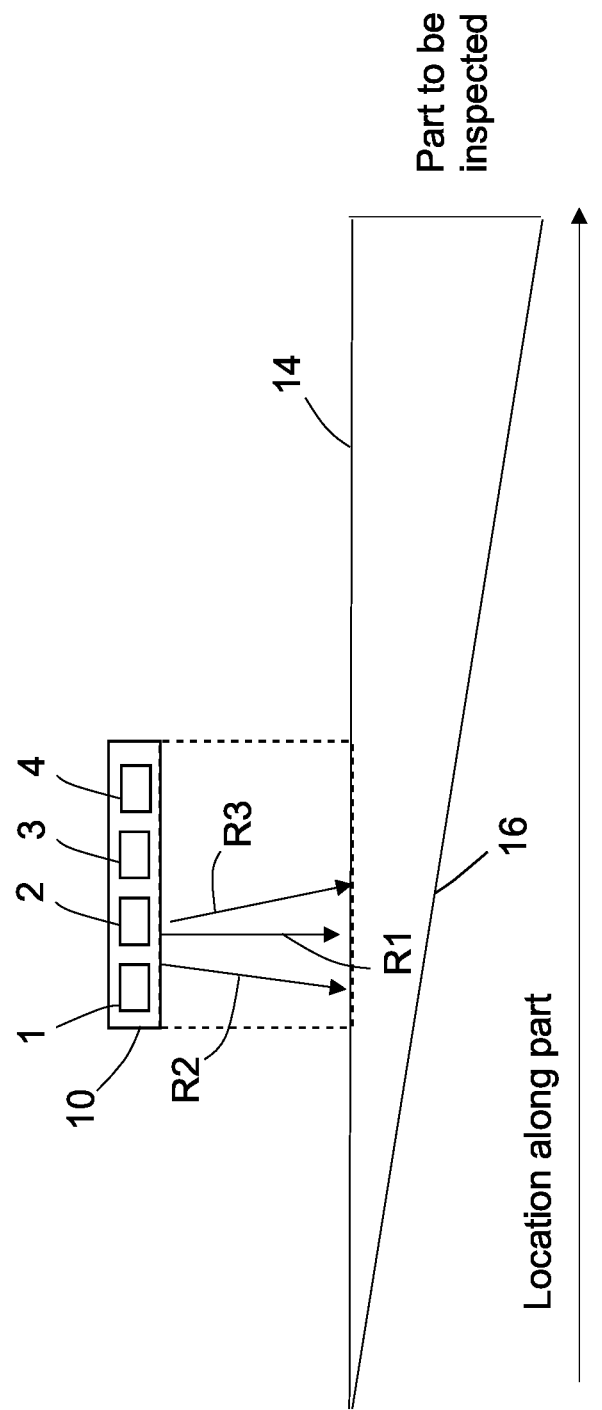
FIG. 9 is a diagram showing respective paths of three rays of ultrasound propagating through the acoustic coupling medium depicted in FIG. 6A after being transmitted by a first transmit aperture consisting of first and second elements.

In accordance with an alternative embodiment, instead of representing the ultrasound as a single ray emanating from the center of the transmit aperture, the simulation could create three rays: one ray at the center of the transmit aperture and two rays that bound the ultrasound beam. An NDI margin value could be calculated for each ray. A resulting NDI margin value could be calculated such as by taking the average, minimum or maximum of the three values. For example, FIG. 9 shows respective paths R1-R3 of three rays of ultrasound propagating through the acoustic coupling medium 12 after being transmitted by a transmit aperture consisting of elements 1 and 2.

Figure 10:
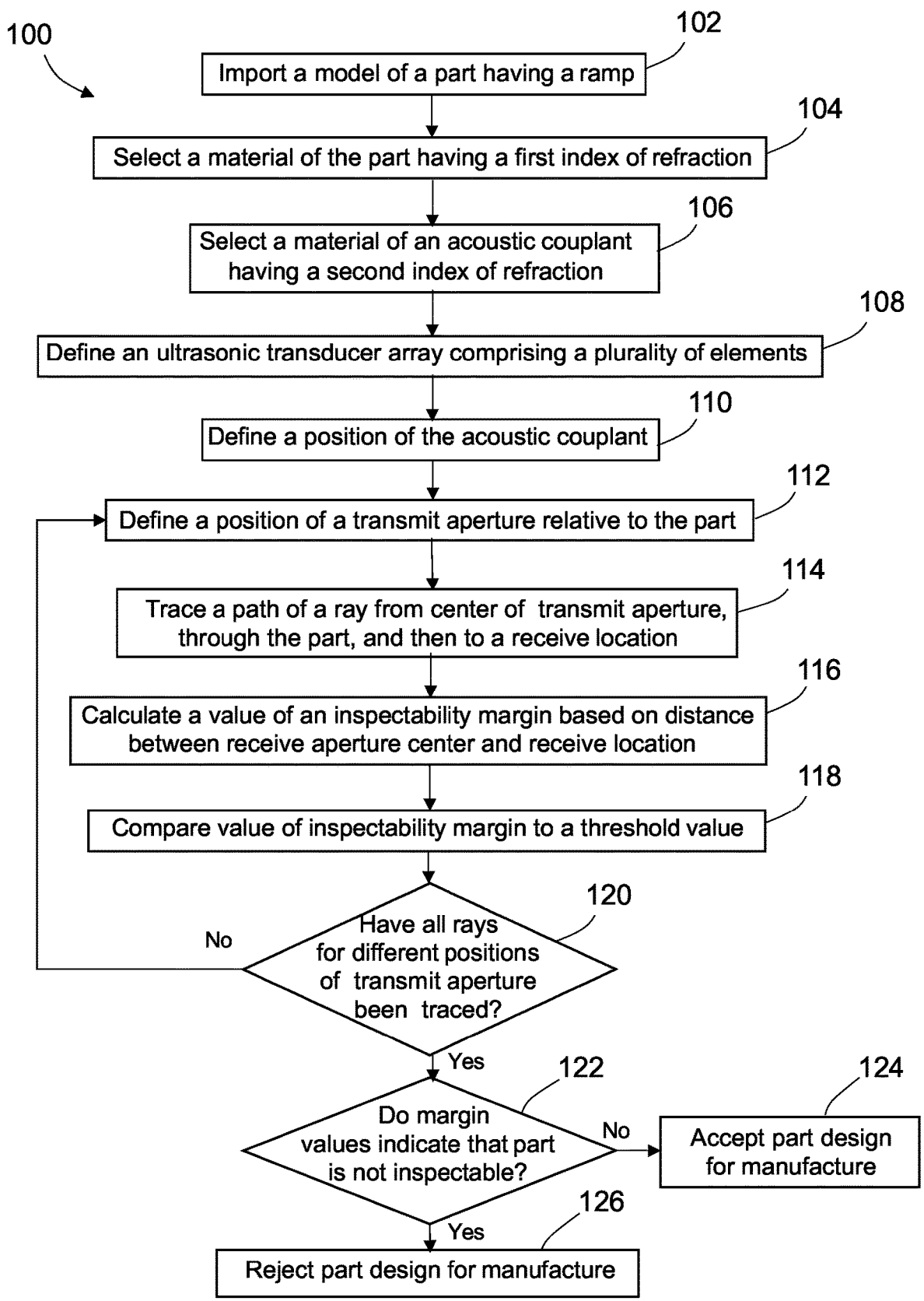
FIG. 10 is a flowchart identifying steps of a method for quantitatively evaluating the expected ultrasonic inspectability of a designed part in accordance with one embodiment.

FIG. 10 is a flowchart identifying steps of a method 100 for quantitatively evaluating the expected ultrasonic inspectability of a designed part in accordance with one embodiment. A model of a part is imported into the computer system (step 102). Then the system operator selects a material of the part having a first index of refraction (step 104). In addition, the system operator selects a material of an acoustic coupling medium having a second index of refraction different than the first index of refraction (step 106). Then the system operator defines an ultrasonic transducer array comprising a plurality of elements (step 108); defines a position of the acoustic coupling medium between the ultrasonic transducer array and the part (step 110); and defines a plurality of positions of a transmit aperture of the ultrasonic transducer array relative to the part (step 112).

For each defined position of the transmit aperture, the method 100 further comprises: tracing a path of a respective ray from a center of the transmit aperture of the ultrasonic transducer array, into and out of the part, and then to a respective receive location on the ultrasonic transducer array (step 114). Also, the computer system calculates a respective value of an inspectability margin based at least in part on a respective distance between a center of the receive aperture and the respective receive location on the ultrasonic transducer array (step 116). Each value of the inspectability margin is compared to a threshold value (step 118). In alternative embodiments, step 118 may be performed for all ray tracings after all rays have been traced rather than after each respective ray is traced.

Following completion of step 118, a determination is made whether all rays for different positions of the transmit aperture have been traced or not (step 120). On the one hand, if a determination is made that not all rays for different positions of the transmit aperture have been traced, the method 100 returns to step 112 and the next ray is traced. On the other hand, if a determination is made that all rays for different positions of the transmit aperture have been traced, the method 100 proceeds to step 122.

In step 122, a determination is made whether the NDI margin values indicate that the part is not ultrasonically inspectable or not. On the one hand, if a determination is made that the NDI margin values indicate that the part is ultrasonically inspectable, the part design is accepted for manufacture (step 124). On the other hand, if a determination is made that the NDI margin values indicate that the part is not ultrasonically inspectable, the part design is rejected for manufacture (step 126).

Figure 11:
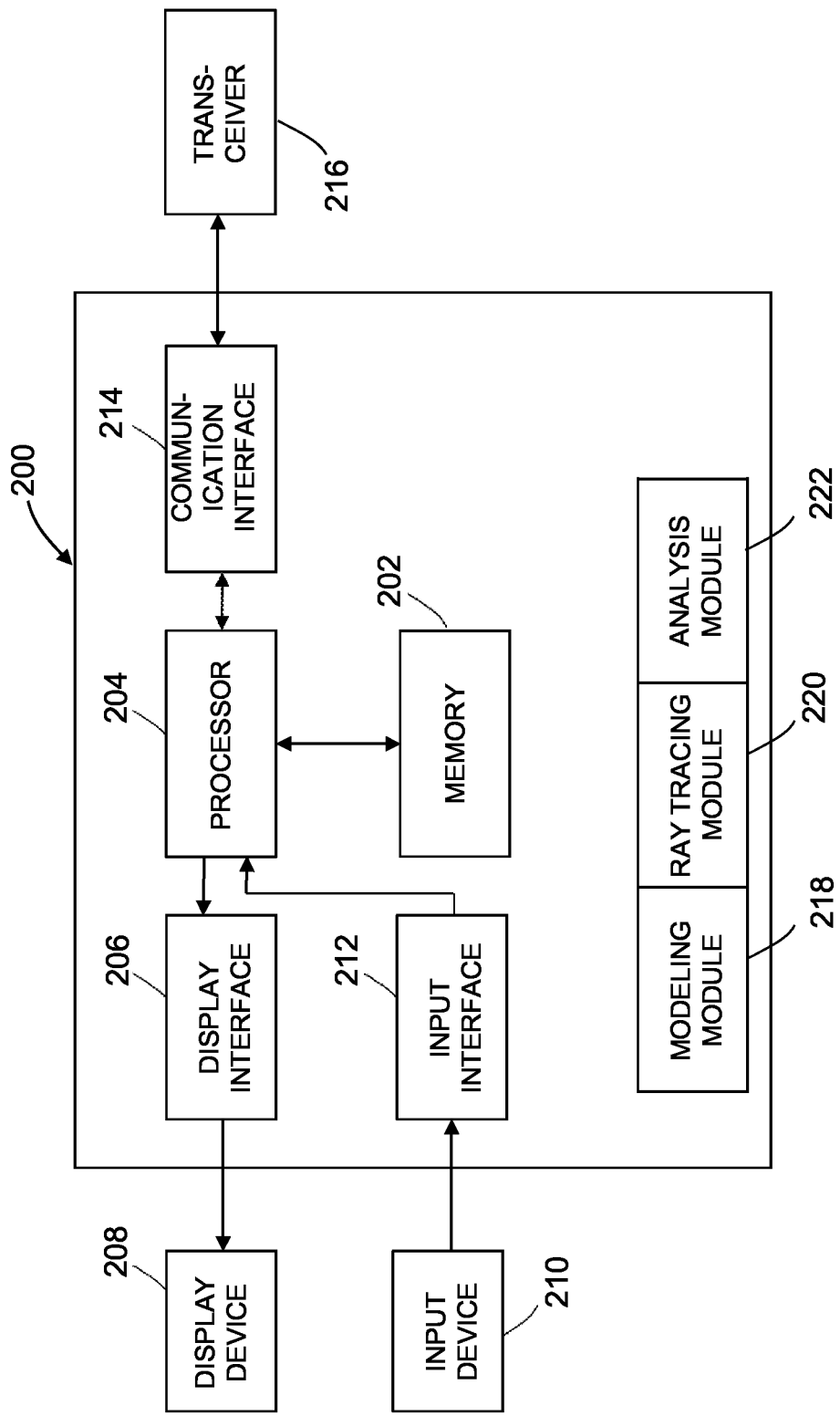
FIG. 11 is a block diagram identifying components of a computer system suitable for executing automated data processing functions such as ray tracing and metric calculation.

FIG. 11 is a block diagram identifying components of a computer system 200 suitable for executing automated data processing functions such as ray tracing and metric calculation. In accordance with one embodiment, computer system 200 comprises a memory device 202 (e.g., a non-transitory tangible computer-readable storage medium) and a processor 204 coupled to memory device 202 for use in executing instructions. More specifically, computer system 200 is configurable to perform one or more operations described herein by programming memory device 202 and/or processor 204. For example, processor 204 may be programmed by encoding an operation as one or more executable instructions and by providing the executable instructions in memory device 202.

Processor 204 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller, an application specific integrated circuit, a field-programmable gate array, and other programmable circuits.

In the exemplary embodiment, memory device 202 includes one or more devices (not shown) that enable information such as executable instructions and/or other data to be selectively stored and retrieved. In the exemplary embodiment, such data may include, but is not limited to, material properties of metallic and composite materials, characteristics of ultrasonic waves, modeling data, imaging data, calibration curves, operational data, and/or control algorithms. In the exemplary embodiment, computer system 200 is configured to perform a ray tracing function as well inspectability metric calculations. Alternatively, computer system 200 may use any algorithm and/or method that enables the methods and systems to function as described herein. Memory device 202 may also include one or more non-transitory tangible computer-readable storage media, such as, without limitation, dynamic random access memory, static random access memory, a solid state disk, and/or a hard disk.

In the exemplary embodiment, computer system 200 further comprises a display interface 206 that is coupled to processor 204 for use in presenting information to a user. For example, display interface 206 may include a display adapter (not shown) that may couple to a display device 208, such as, without limitation, a cathode ray tube, a liquid crystal display, a light-emitting diode (LED) display, an organic LED display, an "electronic ink" display, and/or a printer.

Computer system 200, in the exemplary embodiment, further comprises an input interface 212 for receiving input from the user. For example, in the exemplary embodiment, input interface 212 receives information from an input device 210 suitable for use with the methods described herein. Input interface 212 is coupled to processor 204 and to input device 210, which may include, for example, a joystick, a keyboard, a pointing device, a mouse, a stylus, a touch sensitive panel (e.g., a touch pad or a touch screen), and/or a position detector.

In the exemplary embodiment, computer system 200 further comprises a communication interface 214 that is coupled to processor 204. In the exemplary embodiment, communication interface 214 communicates with at least one remote device, e.g., a transceiver 216. For example, communication interface 214 may use, without limitation, a wired network adapter, a wireless network adapter, and/or a mobile telecommunications adapter. A network (not shown) used to couple computer system 200 to the remote device may include, without limitation, the Internet, a local area network (LAN), a wide area network, a wireless LAN, a mesh network, and/or a virtual private network or other suitable communication means.

In the exemplary embodiment, computer system 200 further comprises simulation software that enables at least some of the methods and systems to function as described herein. In one proposed implementation, the simulation software includes a modeling module 218, a ray tracing module 220, and an analysis module 222. These modules may take the form of code executed by the processor 204. In the exemplary embodiment, modeling module 218 is configured to generate models of composite parts having ramps or other ultrasound-scattering structures; ray tracing module 220 is configured to produce and process ray tracings as described hereinabove; and analysis module 222 is configured to perform inspectability metric calculations and analysis of the inspectability metric data to determine the degree of inspectability of various part designs.

While methods for quantitatively evaluating the expected ultrasonic inspectability of a designed part have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A method for quantitatively evaluating an expected ultrasonic inspectability of a designed part, the method comprising:
   importing a model of a part;
   selecting a material of the part having a first index of refraction;
   selecting a material of an acoustic coupling medium having a second index of refraction different than the first index of refraction;
   defining an ultrasonic transducer array comprising a plurality of elements;
   defining a position of the acoustic coupling medium between the ultrasonic transducer array and the part;
   defining a first position of a transmit aperture of the ultrasonic transducer array relative to the part;
   tracing a path of a first ray from a center of the transmit aperture of the ultrasonic transducer array, into and out of the part, and then to a first receive location on the ultrasonic transducer array;
   calculating a first value of an inspectability margin based at least in part on a distance between a center of a receive aperture and the first receive location on the ultrasonic transducer array; and
   comparing the first value of the inspectability margin to a threshold value.

2. The method as recited in claim 1, wherein tracing comprises:
   (a) tracing a first path of the first ray through the acoustic coupling medium;
   (b) simulating refraction of the first ray at a first interface between the acoustic coupling medium and the part at a point of entry into the part;
   (c) tracing a second path of the first ray through the part from the point of entry to a second interface opposing the first interface;
   (d) simulating reflection of the first ray at the second interface;
   (e) tracing a third path of the first ray through the part from the second interface to a point of exit;
   (f) simulating refraction of the first ray at the first interface at the point of exit; and
   (g) tracing a fourth path of the first ray through the acoustic coupling medium, which fourth path terminates at the receive location on the ultrasonic transducer array.

3. The method as recited in claim 2, wherein step (b) comprises calculating a first angle of refraction of the first ray as the first ray propagates from the acoustic coupling medium into the part using Snell's law.

4. The method as recited in claim 3, wherein step (d) comprises calculating an angle of reflection of the first ray equal to an angle of incidence of the first ray at the second interface.

5. The method as recited in claim 4, wherein step (f) comprises calculating a second angle of refraction of the first ray as the first ray propagates from the part into the acoustic coupling medium using Snell's law.

6. The method as recited in claim 1, further comprising:
   defining a second position of the transmit aperture of the ultrasonic transducer array relative to the part;
   tracing a path of a second ray from a center of the transmit aperture of the ultrasonic transducer array, to a second interface, and then to a second receive location on the ultrasonic transducer array;
   calculating a second value of an inspectability margin based at least in part on a distance between the center of the receive aperture and the second receive location on the ultrasonic transducer array; and
   comparing the second value of the inspectability margin to a threshold value.

7. The method as recited in claim 6, wherein defining the first and second positions of the transmit aperture of the ultrasonic transducer array relative to the part comprises defining first and second positions of the ultrasonic transducer array relative to the part, a group of elements of the transmit aperture being the same while the ultrasonic transducer array is at the first and second positions.

8. The method as recited in claim 6, wherein defining the first and second positions of the transmit aperture of the ultrasonic transducer array relative to the part involves selecting first and second groups of elements of the ultrasonic transducer array having respective centers while a position of the ultrasonic transducer array relative to the part does not change.

9. The method as recited in claim 1, wherein the receive aperture comprises a subset of the plurality of elements of the ultrasonic transducer array, a width of the receive aperture being equal to a number of elements in the subset multiplied by a size of an element.

10. The method as recited in claim 9, wherein calculating the first value of the inspectability margin comprises:
    dividing a half-width of the receive aperture by the distance between the center of the receive aperture and the receive location of the first ray to form a ratio; and
    subtracting unity from the ratio.

11. A method for quantitatively evaluating an expected ultrasonic inspectability of a designed part, the method comprising:
    importing a model of a part;
    selecting a material of the part having a first index of refraction;
    selecting a material of an acoustic coupling medium having a second index of refraction different than the first index of refraction;
    defining an ultrasonic transducer array comprising a plurality of elements;
    defining a position of the acoustic coupling medium between the ultrasonic transducer array and the part;
    defining a plurality of positions of a transmit aperture of the ultrasonic transducer array relative to the part;
    for the defined position of the transmit aperture, tracing a path of an at least one respective ray from a center of the transmit aperture of the ultrasonic transducer array, into and out of the part, and then to a respective receive location on the ultrasonic transducer array;
    for the defined position of a receive aperture, calculating a respective value of an inspectability margin based at least in part on a respective distance between a center of the receive aperture and the respective receive location on the ultrasonic transducer array; and
    comparing at least one value of the inspectability margin to a threshold value.

12. The method as recited in claim 11, further comprising rejecting the part for manufacture if the values of the inspectability margin indicate that a portion of the part is not ultrasonically inspectable.

13. The method as recited in claim 11, further comprising accepting the part for manufacture if the values of the inspectability margin indicate that the part is ultrasonically inspectable.

14. The method as recited in claim 11, wherein tracing comprises:
(a) tracing a first path of a first ray through the acoustic coupling medium;
(b) simulating refraction of the first ray at a first interface between the acoustic coupling medium and the part at a point of entry into the part;
(c) tracing a second path of the first ray through the part from the point of entry to the ramp;
(d) simulating reflection of the first ray at a second interface opposing the first interface;
(e) tracing a third path of the first ray through the part from the second interface to a point of exit;
(f) simulating refraction of the first ray at the first interface at the point of exit; and
(g) tracing a fourth path of the first ray through the acoustic coupling medium, which fourth path terminates at the receive location on the ultrasonic transducer array.

15. The method as recited in claim 11, wherein defining the plurality of positions of the transmit aperture of the ultrasonic transducer array relative to the part comprises defining respective positions of the ultrasonic transducer array relative to the part, a group of elements of the transmit aperture being the same while the ultrasonic transducer array is at the respective positions.

16. The method as recited in claim 11, wherein defining the plurality of positions of the transmit aperture of the ultrasonic transducer array relative to the part involves selecting respective groups of elements of the ultrasonic transducer array having respective centers while a position of the ultrasonic transducer array relative to the part does not change.

17. The method as recited in claim 11, wherein the receive aperture comprises a subset of the plurality of elements of the ultrasonic transducer array, a width of the receive aperture being equal to a number of elements in the subset multiplied by a size of an element.

18. The method as recited in claim 17, wherein calculating the value of the inspectability margin comprises:
dividing a half-width of the receive aperture by the distance between the center of the receive aperture and the receive location of a first ray to form a ratio; and
subtracting unity from the ratio.

19. A method for quantitatively evaluating an expected ultrasonic inspectability of a designed part, the method comprising:
importing a model of a part;
selecting a material of the part having a first index of refraction;
selecting a material of an acoustic coupling medium having a second index of refraction different than the first index of refraction;
defining an ultrasonic transducer array comprising a plurality of elements;
defining a position of the acoustic coupling medium between the ultrasonic transducer array and the part;
defining a position of a transmit aperture of the ultrasonic transducer array relative to the part;
tracing respective paths of a plurality of rays from a center of the transmit aperture of the ultrasonic transducer array, into and out of the part, and then to respective receive locations on the ultrasonic transducer array;
calculating respective values of an inspectability margin based at least in part on respective distances between the center of a receive aperture and the respective receive locations on the ultrasonic transducer array;
calculating a resultant value of the inspectability margin based on one or more of the respective values of the inspectability margin; and
comparing the resultant value of the inspectability margin to a threshold value,
wherein the plurality of rays comprises a first ray representing a centerline of a beam and second and third rays representing respective bounds of the beam.

20. The method as recited in claim 19, wherein calculating the resultant value comprises selecting a maximum value from the respective values of the inspectability margin.

21. The method as recited in claim 19, wherein calculating the resultant value comprises selecting a minimum value from the respective values of the inspectability margin.

22. The method as recited in claim 19, wherein calculating the resultant value comprises calculating an average or a weighted average of the respective values of the inspectability margin.

23. A system comprising: a computer; a memory in communication with the computer; and an application stored in the memory and executable by the computer, wherein the application comprises an input interface and simulation software configured to perform operations comprising:
importing a model of a part;
selecting a material of the part having a first index of refraction;
selecting a material of an acoustic coupling medium having a second index of refraction different than the first index of refraction;
defining an ultrasonic transducer array comprising a plurality of elements;
defining a position of the acoustic coupling medium between the ultrasonic transducer array and the part;
defining a plurality of positions of a transmit aperture of the ultrasonic transducer array relative to the part;
for the defined position of the transmit aperture, tracing a path of a respective ray from a center of the transmit aperture of the ultrasonic transducer array, into and out of the part, and then to a respective receive location on the ultrasonic transducer array;
for the defined position of the transmit aperture, calculating a respective value of an inspectability margin based at least in part on a respective distance between a center of a receive aperture and the respective receive location on the ultrasonic transducer array; and
comparing at least one value of the inspectability margin to a threshold value.

* * * * *